(12) United States Patent
Flaks et al.

(10) Patent No.: US 8,676,581 B2
(45) Date of Patent: Mar. 18, 2014

(54) SPEECH RECOGNITION ANALYSIS VIA IDENTIFICATION INFORMATION

(75) Inventors: Jason Flaks, Redmond, WA (US); Dax Hawkins, Kirkland, WA (US); Christian Klein, Duvall, WA (US); Mitchell Stephen Dernis, Seattle, WA (US); Tommer Leyvand, Seattle, WA (US); Ali M. Vassigh, Redmond, WA (US); Duncan McKay, Woodinville, WA (US)

(73) Assignee: Microsoft Corporation, Redmond, WA (US)

(*) Notice: Subject to any disclaimer, the term of this patent is extended or adjusted under 35 U.S.C. 154(b) by 376 days.

(21) Appl. No.: 12/692,538

(22) Filed: Jan. 22, 2010

(65) Prior Publication Data

US 2011/0184735 A1    Jul. 28, 2011

(51) Int. Cl.
*G10L 15/00*    (2013.01)

(52) U.S. Cl.
USPC ........... 704/240; 704/270; 704/272; 704/275; 704/233; 704/235; 704/9; 704/231; 704/251; 348/46; 348/143; 348/78; 348/333.01; 361/92; 396/56; 700/258

(58) Field of Classification Search
USPC .................................. 704/240, 270, 272, 275
See application file for complete search history.

(56) References Cited

U.S. PATENT DOCUMENTS

| | | |
|---|---|---|
| 4,627,620 A | 12/1986 | Yang |
| 4,630,910 A | 12/1986 | Ross et al. |
| 4,645,458 A | 2/1987 | Williams |
| 4,695,953 A | 9/1987 | Blair et al. |
| 4,702,475 A | 10/1987 | Elstein et al. |
| 4,711,543 A | 12/1987 | Blair et al. |
| 4,751,642 A | 6/1988 | Silva et al. |

(Continued)

FOREIGN PATENT DOCUMENTS

| | | |
|---|---|---|
| CN | 201254344 B | 6/2010 |
| EP | 0583061 A2 | 2/1994 |

(Continued)

OTHER PUBLICATIONS

Shiell, et al., "Chapter I Audio-Visual and Visual-Only Speech and Speaker Recognition: Issues about Theory, System Design, and Implementation", Retrieved at <<http://www.igi-global.com/downloads/excerpts/9676.pdf>>, 2009, pp. 38.

(Continued)

*Primary Examiner* — Pierre-Louis Desir
*Assistant Examiner* — Fariba Sirjani
(74) *Attorney, Agent, or Firm* — Judy Yee; Micky Minhas (57) ABSTRACT

Embodiments are disclosed that relate to the use of identity information to help avoid the occurrence of false positive speech recognition events in a speech recognition system. One embodiment provides a method comprising receiving speech recognition data comprising a recognized speech segment, acoustic locational data related to a location of origin of the recognized speech segment as determined via signals from the microphone array, and confidence data comprising a recognition confidence value, and also receiving image data comprising visual locational information related to a location of each person in an image. The acoustic locational data is compared to the visual locational data to determine whether the recognized speech segment originated from a person in the field of view of the image sensor, and the confidence data is adjusted depending on this determination.

20 Claims, 6 Drawing Sheets

(56) References Cited

U.S. PATENT DOCUMENTS

| | | | |
|---|---|---|---|
| 4,796,997 A | 1/1989 | Svetkoff et al. | |
| 4,809,065 A | 2/1989 | Harris et al. | |
| 4,817,950 A | 4/1989 | Goo | |
| 4,843,568 A | 6/1989 | Krueger et al. | |
| 4,893,183 A | 1/1990 | Nayar | |
| 4,901,362 A | 2/1990 | Terzian | |
| 4,925,189 A | 5/1990 | Braeunig | |
| 5,101,444 A | 3/1992 | Wilson et al. | |
| 5,148,154 A | 9/1992 | MacKay et al. | |
| 5,184,295 A | 2/1993 | Mann | |
| 5,229,754 A | 7/1993 | Aoki et al. | |
| 5,229,756 A | 7/1993 | Kosugi et al. | |
| 5,239,463 A | 8/1993 | Blair et al. | |
| 5,239,464 A | 8/1993 | Blair et al. | |
| 5,288,078 A | 2/1994 | Capper et al. | |
| 5,295,491 A | 3/1994 | Gevins | |
| 5,320,538 A | 6/1994 | Baum | |
| 5,347,306 A | 9/1994 | Nitta | |
| 5,385,519 A | 1/1995 | Hsu et al. | |
| 5,405,152 A | 4/1995 | Katanics et al. | |
| 5,417,210 A | 5/1995 | Funda et al. | |
| 5,423,554 A | 6/1995 | Davis | |
| 5,454,043 A | 9/1995 | Freeman | |
| 5,465,317 A * | 11/1995 | Epstein | 704/236 |
| 5,469,740 A | 11/1995 | French et al. | |
| 5,495,576 A | 2/1996 | Ritchey | |
| 5,516,105 A | 5/1996 | Eisenbrey et al. | |
| 5,524,637 A | 6/1996 | Erickson | |
| 5,534,917 A | 7/1996 | MacDougall | |
| 5,563,988 A | 10/1996 | Maes et al. | |
| 5,566,272 A * | 10/1996 | Brems et al. | 704/231 |
| 5,577,981 A | 11/1996 | Jarvik | |
| 5,580,249 A | 12/1996 | Jacobsen et al. | |
| 5,594,469 A | 1/1997 | Freeman et al. | |
| 5,597,309 A | 1/1997 | Riess | |
| 5,616,078 A | 4/1997 | Oh | |
| 5,617,312 A | 4/1997 | Iura et al. | |
| 5,638,300 A | 6/1997 | Johnson | |
| 5,641,288 A | 6/1997 | Zaenglein | |
| 5,682,196 A | 10/1997 | Freeman | |
| 5,682,229 A | 10/1997 | Wangler | |
| 5,690,582 A | 11/1997 | Ulrich et al. | |
| 5,703,367 A | 12/1997 | Hashimoto et al. | |
| 5,704,837 A | 1/1998 | Iwasaki et al. | |
| 5,710,866 A * | 1/1998 | Alleva et al. | 704/256.4 |
| 5,715,834 A | 2/1998 | Bergamasco et al. | |
| 5,855,000 A * | 12/1998 | Waibel et al. | 704/235 |
| 5,875,108 A | 2/1999 | Hoffberg et al. | |
| 5,877,803 A | 3/1999 | Wee et al. | |
| 5,913,727 A | 6/1999 | Ahdoot | |
| 5,933,125 A | 8/1999 | Fernie et al. | |
| 5,980,256 A | 11/1999 | Carmein | |
| 5,989,157 A | 11/1999 | Walton | |
| 5,995,649 A | 11/1999 | Marugame | |
| 6,005,548 A | 12/1999 | Latypov et al. | |
| 6,009,210 A | 12/1999 | Kang | |
| 6,054,991 A | 4/2000 | Crane et al. | |
| 6,066,075 A | 5/2000 | Poulton | |
| 6,072,494 A | 6/2000 | Nguyen | |
| 6,073,489 A | 6/2000 | French et al. | |
| 6,077,201 A | 6/2000 | Cheng et al. | |
| 6,098,458 A | 8/2000 | French et al. | |
| 6,100,896 A | 8/2000 | Strohecker et al. | |
| 6,101,289 A | 8/2000 | Kellner | |
| 6,128,003 A | 10/2000 | Smith et al. | |
| 6,130,677 A | 10/2000 | Kunz | |
| 6,141,463 A | 10/2000 | Covell et al. | |
| 6,147,678 A | 11/2000 | Kumar et al. | |
| 6,152,856 A | 11/2000 | Studor et al. | |
| 6,159,100 A | 12/2000 | Smith | |
| 6,173,066 B1 | 1/2001 | Peurach et al. | |
| 6,181,343 B1 | 1/2001 | Lyons | |
| 6,188,777 B1 | 2/2001 | Darrell et al. | |
| 6,215,890 B1 | 4/2001 | Matsuo et al. | |
| 6,215,898 B1 | 4/2001 | Woodfill et al. | |
| 6,226,396 B1 | 5/2001 | Marugame | |
| 6,229,913 B1 | 5/2001 | Nayar et al. | |
| 6,243,683 B1 * | 6/2001 | Peters | 704/273 |
| 6,256,033 B1 | 7/2001 | Nguyen | |
| 6,256,400 B1 | 7/2001 | Takata et al. | |
| 6,283,860 B1 | 9/2001 | Lyons et al. | |
| 6,289,112 B1 | 9/2001 | Jain et al. | |
| 6,299,308 B1 | 10/2001 | Voronka et al. | |
| 6,308,565 B1 | 10/2001 | French et al. | |
| 6,316,934 B1 | 11/2001 | Amorai-Moriya et al. | |
| 6,345,111 B1 * | 2/2002 | Yamaguchi et al. | 382/118 |
| 6,363,160 B1 | 3/2002 | Bradski et al. | |
| 6,384,819 B1 | 5/2002 | Hunter | |
| 6,411,744 B1 | 6/2002 | Edwards | |
| 6,430,997 B1 | 8/2002 | French et al. | |
| 6,476,834 B1 | 11/2002 | Doval et al. | |
| 6,496,598 B1 | 12/2002 | Harman | |
| 6,503,195 B1 | 1/2003 | Keller et al. | |
| 6,539,931 B2 | 4/2003 | Trajkovic et al. | |
| 6,570,555 B1 | 5/2003 | Prevost et al. | |
| 6,594,629 B1 * | 7/2003 | Basu et al. | 704/251 |
| 6,633,294 B1 | 10/2003 | Rosenthal et al. | |
| 6,640,202 B1 | 10/2003 | Dietz et al. | |
| 6,661,918 B1 | 12/2003 | Gordon et al. | |
| 6,681,031 B2 | 1/2004 | Cohen et al. | |
| 6,714,665 B1 | 3/2004 | Hanna et al. | |
| 6,731,799 B1 | 5/2004 | Sun et al. | |
| 6,735,562 B1 | 5/2004 | Zhang et al. | |
| 6,738,066 B1 | 5/2004 | Nguyen | |
| 6,765,726 B2 | 7/2004 | French et al. | |
| 6,788,809 B1 | 9/2004 | Grzeszczuk et al. | |
| 6,801,637 B2 | 10/2004 | Voronka et al. | |
| 6,807,529 B2 * | 10/2004 | Johnson et al. | 704/270.1 |
| 6,853,972 B2 * | 2/2005 | Friedrich et al. | 704/275 |
| 6,873,723 B1 | 3/2005 | Aucsmith et al. | |
| 6,876,496 B2 | 4/2005 | French et al. | |
| 6,882,971 B2 * | 4/2005 | Craner | 704/246 |
| 6,937,742 B2 | 8/2005 | Roberts et al. | |
| 6,950,534 B2 | 9/2005 | Cohen et al. | |
| 6,964,023 B2 * | 11/2005 | Maes et al. | 715/811 |
| 6,993,482 B2 * | 1/2006 | Ahlenius | 704/235 |
| 7,003,134 B1 | 2/2006 | Covell et al. | |
| 7,036,094 B1 | 4/2006 | Cohen et al. | |
| 7,038,855 B2 | 5/2006 | French et al. | |
| 7,039,676 B1 | 5/2006 | Day et al. | |
| 7,042,440 B2 | 5/2006 | Pryor et al. | |
| 7,046,300 B2 * | 5/2006 | Iyengar et al. | 348/515 |
| 7,050,606 B2 | 5/2006 | Paul et al. | |
| 7,058,204 B2 | 6/2006 | Hildreth et al. | |
| 7,060,957 B2 | 6/2006 | Lange et al. | |
| 7,113,201 B1 * | 9/2006 | Taylor et al. | 348/14.08 |
| 7,113,918 B1 | 9/2006 | Ahmad et al. | |
| 7,121,946 B2 | 10/2006 | Paul et al. | |
| 7,170,492 B2 | 1/2007 | Bell | |
| 7,184,048 B2 | 2/2007 | Hunter | |
| 7,202,898 B1 | 4/2007 | Braun et al. | |
| 7,222,078 B2 | 5/2007 | Abelow | |
| 7,227,526 B2 | 6/2007 | Hildreth et al. | |
| 7,227,960 B2 * | 6/2007 | Kataoka | 381/92 |
| 7,228,275 B1 | 6/2007 | Endo et al. | |
| 7,259,747 B2 | 8/2007 | Bell | |
| 7,308,112 B2 | 12/2007 | Fujimura et al. | |
| 7,317,836 B2 | 1/2008 | Fujimura et al. | |
| 7,321,853 B2 * | 1/2008 | Asano | 704/238 |
| 7,348,963 B2 | 3/2008 | Bell | |
| 7,359,121 B2 | 4/2008 | French et al. | |
| 7,367,887 B2 | 5/2008 | Watabe et al. | |
| 7,379,563 B2 | 5/2008 | Shamaie | |
| 7,379,566 B2 | 5/2008 | Hildreth | |
| 7,389,591 B2 | 6/2008 | Jaiswal et al. | |
| 7,412,077 B2 | 8/2008 | Li et al. | |
| 7,421,093 B2 | 9/2008 | Hildreth et al. | |
| 7,428,000 B2 * | 9/2008 | Cutler et al. | 348/14.11 |
| 7,430,312 B2 | 9/2008 | Gu | |
| 7,436,496 B2 | 10/2008 | Kawahito | |
| 7,447,635 B1 * | 11/2008 | Konopka et al. | 704/275 |
| 7,450,736 B2 | 11/2008 | Yang et al. | |
| 7,452,275 B2 | 11/2008 | Kuraishi | |
| 7,460,690 B2 | 12/2008 | Cohen et al. | |

(56) References Cited

U.S. PATENT DOCUMENTS

| | | | |
|---|---|---|---|
| 7,489,812 B2 | 2/2009 | Fox et al. | |
| 7,536,032 B2 | 5/2009 | Bell | |
| 7,555,142 B2 | 6/2009 | Hildreth et al. | |
| 7,560,701 B2 | 7/2009 | Oggier et al. | |
| 7,570,805 B2 | 8/2009 | Gu | |
| 7,574,020 B2 | 8/2009 | Shamaie | |
| 7,576,727 B2 | 8/2009 | Bell | |
| 7,580,570 B2 | 8/2009 | Manu et al. | |
| 7,590,262 B2 | 9/2009 | Fujimura et al. | |
| 7,593,552 B2 | 9/2009 | Higaki et al. | |
| 7,598,942 B2 | 10/2009 | Underkoffler et al. | |
| 7,607,509 B2 | 10/2009 | Schmiz et al. | |
| 7,620,202 B2 | 11/2009 | Fujimura et al. | |
| 7,668,340 B2 | 2/2010 | Cohen et al. | |
| 7,680,287 B2* | 3/2010 | Amada et al. | 381/92 |
| 7,680,298 B2 | 3/2010 | Roberts et al. | |
| 7,683,954 B2 | 3/2010 | Ichikawa et al. | |
| 7,684,592 B2 | 3/2010 | Paul et al. | |
| 7,684,982 B2* | 3/2010 | Taneda | 704/233 |
| 7,697,827 B2* | 4/2010 | Konicek | 396/56 |
| 7,701,439 B2 | 4/2010 | Hillis et al. | |
| 7,702,130 B2 | 4/2010 | Im et al. | |
| 7,704,135 B2 | 4/2010 | Harrison, Jr. | |
| 7,710,391 B2 | 5/2010 | Bell et al. | |
| 7,729,530 B2 | 6/2010 | Antonov et al. | |
| 7,746,345 B2 | 6/2010 | Hunter | |
| 7,760,182 B2 | 7/2010 | Ahmad et al. | |
| 7,801,726 B2* | 9/2010 | Ariu | 704/243 |
| 7,809,167 B2 | 10/2010 | Bell | |
| 7,834,846 B1 | 11/2010 | Bell | |
| 7,852,262 B2 | 12/2010 | Namineni et al. | |
| RE42,256 E | 3/2011 | Edwards | |
| 7,898,522 B2 | 3/2011 | Hildreth et al. | |
| 8,024,185 B2* | 9/2011 | Do et al. | 704/235 |
| 8,035,612 B2 | 10/2011 | Bell et al. | |
| 8,035,614 B2 | 10/2011 | Bell et al. | |
| 8,035,624 B2 | 10/2011 | Bell et al. | |
| 8,072,470 B2 | 12/2011 | Marks | |
| 8,073,690 B2* | 12/2011 | Nakadai et al. | 704/233 |
| 8,296,151 B2* | 10/2012 | Klein et al. | 704/275 |
| 8,315,366 B2* | 11/2012 | Basart et al. | 379/142.01 |
| 8,384,668 B2* | 2/2013 | Barney et al. | 345/158 |
| 8,442,833 B2* | 5/2013 | Chen | 704/270 |
| 8,543,394 B2* | 9/2013 | Shin | 704/235 |
| 2002/0116197 A1* | 8/2002 | Erten | 704/273 |
| 2003/0009329 A1* | 1/2003 | Stahl et al. | 704/233 |
| 2003/0018475 A1* | 1/2003 | Basu et al. | 704/270 |
| 2004/0037450 A1* | 2/2004 | Bradski | 382/103 |
| 2004/0054531 A1* | 3/2004 | Asano | 704/231 |
| 2004/0119754 A1* | 6/2004 | Bangalore et al. | 345/809 |
| 2004/0193413 A1* | 9/2004 | Wilson et al. | 704/243 |
| 2004/0260554 A1* | 12/2004 | Connell et al. | 704/270 |
| 2004/0267521 A1* | 12/2004 | Cutler et al. | 704/202 |
| 2005/0060142 A1* | 3/2005 | Visser et al. | 704/201 |
| 2006/0085187 A1* | 4/2006 | Barquilla | 704/243 |
| 2006/0143017 A1* | 6/2006 | Sonoura et al. | 704/275 |
| 2008/0026838 A1 | 1/2008 | Dunstan et al. | |
| 2008/0059175 A1* | 3/2008 | Miyajima | 704/246 |
| 2008/0165388 A1* | 7/2008 | Serlet | 358/448 |
| 2008/0309761 A1* | 12/2008 | Kienzle et al. | 348/143 |
| 2008/0312918 A1* | 12/2008 | Kim | 704/233 |
| 2009/0018828 A1* | 1/2009 | Nakadai et al. | 704/234 |
| 2009/0030552 A1* | 1/2009 | Nakadai et al. | 700/258 |
| 2009/0067590 A1* | 3/2009 | Bushey et al. | 379/88.14 |
| 2009/0119096 A1* | 5/2009 | Gerl et al. | 704/207 |
| 2009/0125311 A1* | 5/2009 | Haulick et al. | 704/275 |
| 2009/0150146 A1* | 6/2009 | Cho et al. | 704/233 |
| 2009/0150156 A1* | 6/2009 | Kennewick et al. | 704/257 |
| 2009/0171664 A1* | 7/2009 | Kennewick et al. | 704/257 |
| 2010/0134677 A1* | 6/2010 | Yamamoto et al. | 348/333.01 |
| 2010/0207875 A1* | 8/2010 | Yeh | 345/156 |
| 2010/0211387 A1* | 8/2010 | Chen | 704/226 |
| 2010/0217604 A1* | 8/2010 | Baldwin et al. | 704/275 |
| 2010/0299144 A1* | 11/2010 | Barzelay et al. | 704/233 |
| 2010/0312547 A1* | 12/2010 | Van Os et al. | 704/9 |
| 2010/0315905 A1* | 12/2010 | Lee et al. | 367/127 |
| 2011/0035224 A1* | 2/2011 | Sipe | 704/270 |
| 2011/0043617 A1* | 2/2011 | Vertegaal et al. | 348/78 |
| 2011/0054899 A1* | 3/2011 | Phillips et al. | 704/235 |
| 2011/0107216 A1* | 5/2011 | Bi | 715/716 |
| 2011/0112839 A1* | 5/2011 | Funakoshi et al. | 704/249 |
| 2011/0164769 A1* | 7/2011 | Zhan et al. | 381/307 |
| 2012/0327193 A1* | 12/2012 | Dernis et al. | 348/46 |
| 2013/0195285 A1* | 8/2013 | De La Fuente et al. | 381/92 |
| 2013/0253929 A1* | 9/2013 | Weider et al. | 704/235 |

FOREIGN PATENT DOCUMENTS

| | | | |
|---|---|---|---|
| JP | 08044490 A1 | 2/1996 | |
| WO | 93/10708 A1 | 6/1993 | |
| WO | 97/17598 A1 | 5/1997 | |
| WO | 99/44698 A1 | 9/1999 | |

OTHER PUBLICATIONS

Gurban, Mihai, "Multimodal Feature Extraction and Fusion for Audio-Visual Speech Recognition", Retrieved at <<http://biblion.epfl.ch/EPFL/theses/2009/4292/EPFL_TH4292.pdf>>, Jan. 2009, pp. 140.

Kittler, et al., "Combining Evidence in Multimodal Personal Identity Recognition Systems", Retrieved at <<www.springerlink.com/index/w17Ign58h8538k54.pdf>>, Apr. 2006, pp. 327-334.

Nakadai, et al.,"Improvement of Recognition of Simultaneous Speech Signals Using AV Integration and Scattering Theory for Humanoid Robots", Retrieved at <<http://www.sciencedirect.com/science?_ob=MImg&imagekey=B6V1C-4DS9W7 H-3-1&_cdi=5671&_user=3765386&_orig=search&_coverDate=10%2F01% 2F2004&_sk=999559998&view=c&wchp=dGLbVtz-zSkzk&md5=813c2f68cd13f188baf7b0d6f5457007&ie=isdarticle.pdf>>, Oct. 2004, pp. 16.

Kim, et al., "Hybrid Confidence Measure for Domain-Specific Keyword Spotting", Retrieved at <<http://www.springerlink.com/content/gcgyggn8hxh5w36a/fulltext.pdf>>, Jan. 2002, pp. 10.

Cooke, et al., "Gaze-contingent automatic speech recognition", retrieved at <<http://ieeexplore.ieee.org/stamp/stamp.jsp?isnumber=4693967&arnumber=4693973&punumber=4159607>>, Nov. 12, 2009, pp. 12.

Kanade et al., "A Stereo Machine for Video-rate Dense Depth Mapping and Its New Applications", IEEE Computer Society Conference on Computer Vision and Pattern Recognition, 1996, pp. 196-202,The Robotics Institute, Carnegie Mellon University, Pittsburgh, PA.

Miyagawa et al., "CCD-Based Range Finding Sensor", Oct. 1997, pp. 1648-1652, vol. 44 No. 10, IEEE Transactions on Electron Devices.

Rosenhahn et al., "Automatic Human Model Generation", 2005, pp. 41-48, University of Auckland (CITR), New Zealand.

Aggarwal et al., "Human Motion Analysis: A Review", IEEE Nonrigid and Articulated Motion Workshop, 1997, University of Texas at Austin, Austin, TX.

Shao et al., "An Open System Architecture for a Multimedia and Multimodal User Interface", Aug. 24, 1998, Japanese Society for Rehabilitation of Persons with Disabilities (JSRPD), Japan.

Kohler, "Special Topics of Gesture Recognition Applied in Intelligent Home Environments", In Proceedings of the Gesture Workshop, 1998, pp. 285-296, Germany.

Kohler, "Vision Based Remote Control in Intelligent Home Environments", University of Erlangen-Nuremberg/ Germany, 1996, pp. 147-154, Germany.

Kohler, "Technical Details and Ergonomical Aspects of Gesture Recognition applied in Intelligent Home Environments", 1997, Germany.

Hasegawa et al., "Human-Scale Haptic Interaction with a Reactive Virtual Human in a Real-Time Physics Simulator", Jul. 2006, vol. 4, No. 3, Article 6C, ACM Computers in Entertainment, New York, NY.

Qian et al., "A Gesture-Driven Multimodal Interactive Dance System", Jun. 2004, pp. 1579-1582, IEEE International Conference on Multimedia and Expo (ICME), Taipei, Taiwan.

(56) References Cited

OTHER PUBLICATIONS

Zhao, "Dressed Human Modeling, Detection, and Parts Localization", 2001, The Robotics Institute, Carnegie Mellon University, Pittsburgh, PA.

He, "Generation of Human Body Models", Apr. 2005, University of Auckland, New Zealand.

Isard et al., "Condensation—Conditional Density Propagation for Visual Tracking", 1998, pp. 5-28, International Journal of Computer Vision 29(1), Netherlands.

Livingston, "Vision-based Tracking with Dynamic Structured Light for Video See-through Augmented Reality", 1998, University of North Carolina at Chapel Hill, North Carolina, USA.

Wren et al., "Pfinder: Real-Time Tracking of the Human Body", MIT Media Laboratory Perceptual Computing Section Technical Report No. 353, Jul. 1997, vol. 19, No. 7, pp. 780-785, IEEE Transactions on Pattern Analysis and Machine Intelligence, Caimbridge, MA.

Breen et al., "Interactive Occlusion and Collusion of Real and Virtual Objects in Augmented Reality", Technical Report ECRC-95-02, 1995, European Computer-Industry Research Center GmbH, Munich, Germany.

Freeman et al., "Television Control by Hand Gestures", Dec. 1994, Mitsubishi Electric Research Laboratories, TR94-24, Caimbridge, MA.

Hongo et al., "Focus of Attention for Face and Hand Gesture Recognition Using Multiple Cameras", Mar. 2000, pp. 156-161, 4th IEEE International Conference on Automatic Face and Gesture Recognition, Grenoble, France.

Pavlovic et al., "Visual Interpretation of Hand Gestures for Human-Computer Interaction: A Review", Jul. 1997, pp. 677-695, vol. 19, No. 7, IEEE Transactions on Pattern Analysis and Machine Intelligence.

Azarbayejani et al., "Visually Controlled Graphics", Jun. 1993, vol. 15, No. 6, IEEE Transactions on Pattern Analysis and Machine Intelligence.

Granieri et al., "Simulating Humans in VR", The British Computer Society, Oct. 1994, Academic Press.

Brogan et al., "Dynamically Simulated Characters in Virtual Environments", Sep./Oct. 1998, pp. 2-13, vol. 18, Issue 5, IEEE Computer Graphics and Applications.

Fisher et al., "Virtual Environment Display System", ACM Workshop on Interactive 3D Graphics, Oct. 1986, Chapel Hill, NC.

"Virtual High Anxiety", Tech Update, Aug. 1995, pp. 22.

Sheridan et al., "Virtual Reality Check", Technology Review, Oct. 1993, pp. 22-28, vol. 96, No. 7.

Stevens, "Flights into Virtual Reality Treating Real World Disorders", The Washington Post, Mar. 27, 1995, Science Psychology, 2 pages.

"Simulation and Training", 1994, Division Incorporated.

"Notice on China Third Office Action", Mailed Date: Sep. 10, 2012, Application No. 201110031166.6, Filed Date:Jan. 21, 2011, pp. 9.

\* cited by examiner

SPEECH RECOGNITION ANALYSIS VIA IDENTIFICATION INFORMATION

BACKGROUND

Speech recognition technology allows a user of a computing device to make inputs via speech commands, rather than via a keyboard or other peripheral device input device. One difficulty shared by different speech recognition systems is discerning intended speech inputs from other received sounds, including but not limited to background noise, background speech, and speech from a current system user that is not intended to be an input.

Various methods have been proposed to discern intended speech inputs from other sounds. For example, some speech input systems require a user to say a specific command, such as "start listening," before any speech will be accepted and analyzed as an input. However, such systems may still be susceptible to background noise that randomly matches recognized speech patterns and that therefore may be interpreted as input. Such "false positives" may result in a speech recognition system performing actions not intended by a user, or performing actions even when no users are present.

SUMMARY

Accordingly, various embodiments are disclosed herein that relate to the use of identity information to help avoid the occurrence of false positive speech recognition events in a speech recognition system. For example, one disclosed embodiment provides a method of operating a speech recognition input system. The method comprises receiving speech recognition data comprising a recognized speech segment, acoustic locational data related to a location of origin of the recognized speech segment as determined via signals from the microphone array, and confidence data comprising a recognition confidence value, and also receiving image data comprising visual locational information related to a location of each person located in a field of view of the image sensor. The acoustic locational data is compared to the visual locational data to determine whether the recognized speech segment originated from a person in the field of view of the image sensor. The method further comprises adjusting the confidence data based upon whether the recognized speech segment is determined to have originated from a person in the field of view of the image sensor.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

The present disclosure is directed to avoiding false positive speech recognitions in a speech recognition input system. Further, the disclosed embodiments also may help to ensure that a speech recognition event originated from a desired user in situations where there are multiple users in the speech recognition system environment. For example, where a plurality of users are playing a game show-themed video game and the game requests a specific person to answer a specific question, the disclosed embodiments may help to block answers called by other users. It will be understood that speech recognition input systems may be used to enable speech inputs for any suitable device. Examples include, but are not limited to, interactive entertainment systems such as video game consoles, digital video recorders, digital televisions and other media players, and devices that combine two or more of these functionalities.

Figure 1:
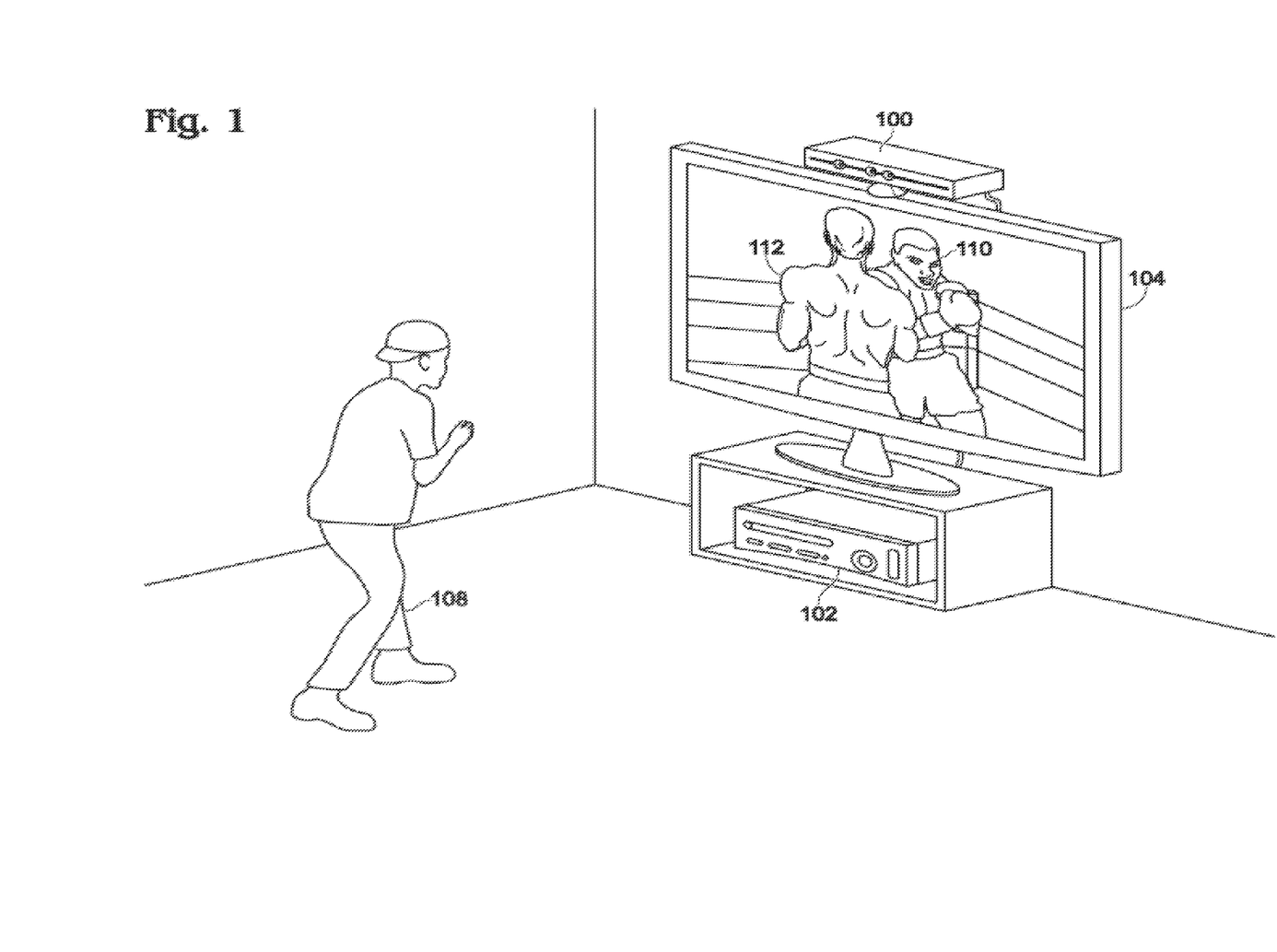
FIG. 1 shows an embodiment of an example speech input environment in the form of a video game environment.

FIG. 1 shows an example speech recognition use environment in the form of an interactive entertainment system 10 that may be used to play a variety of different games, play one or more different media types, and/or control or manipulate non-game applications. The interactive entertainment system 10 comprises a console 102 configured to display an image on a display 104, shown as a television which may be used to present game visuals to one or more game players. It will be understood that the example embodiment shown in FIG. 1 is presented for the purpose of illustration, and is not intended to be limiting in any manner.

Entertainment system 10 further comprises an input device 100 having a depth-sensing camera and a microphone array. The depth-sensing camera may be used to visually monitor one or more users of entertainment system 10, and the microphone array may be used to receive speech commands made by the players. The use of a microphone array, rather than a single microphone, allows information regarding the location of a source of a sound (e.g. a player speaking) to be determined from the audio data.

The data acquired by input device 100 allows a player to make inputs without the use of a hand-held controller or other remote device. Instead, speech inputs, movements, and/or combinations thereof may be interpreted by entertainment system 10 as controls that can be used to affect the game being executed by entertainment system 10.

The movements and speech inputs of game player 108 may be interpreted as virtually any type of game control. For example, the example scenario illustrated in FIG. 1 shows game player 108 playing a boxing game that is being executed by interactive entertainment system 10. The gaming system uses television 104 to visually present a boxing opponent 110 to game player 108. Furthermore, the entertainment system 10 also visually presents a player avatar 112 that game player 108 controls with movements. For example, game player 108 can throw a punch in physical space as an instruction for player avatar 112 to throw a punch in game space. Entertainment system 10 and input device 100 can be used to recognize and analyze the punch of game player 108 in physical space so that the punch can be interpreted as a game control that causes player avatar 112 to throw a punch in game space. Speech commands also may be used to control aspects of play.

Furthermore, some movements and speech inputs may be interpreted as controls that serve purposes other than controlling player avatar 112. For example, the player may use movements and/or speech commands to end, pause, or save a game, select a level, view high scores, communicate with a friend, etc. The illustrated boxing scenario is provided as an example, but is not meant to be limiting in any way. To the contrary, the illustrated scenario is intended to demonstrate a general concept, which may be applied to a variety of different applications without departing from the scope of this disclosure.

Figure 2:
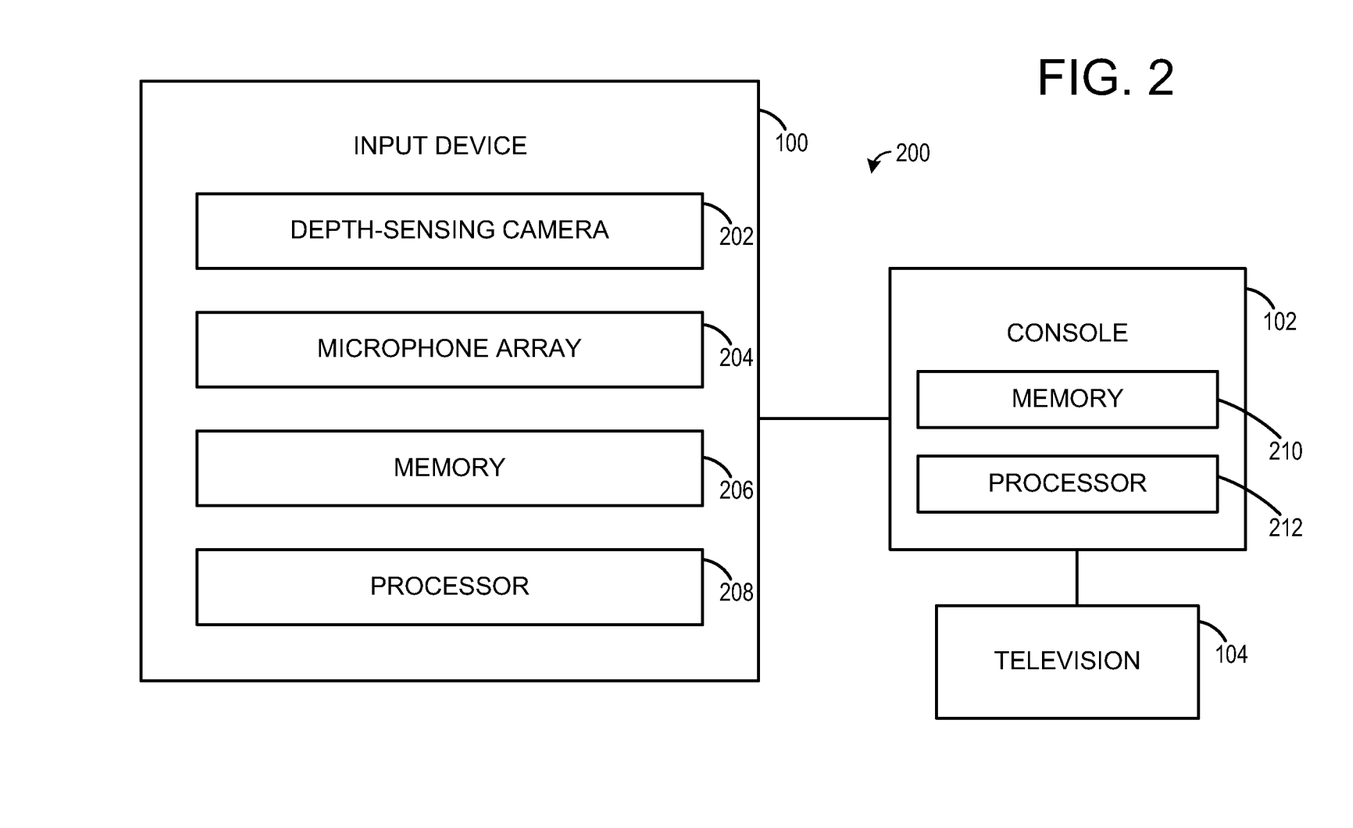
FIG. 2 shows a block diagram of an embodiment of a computing system comprising a speech recognition input system.

FIG. 2 shows a block diagram of the embodiment of FIG. 1. As mentioned above, input device 100 comprises an image sensor, such as a depth-sensing camera 202 to detect player motion, and also comprises a microphone array 204 to detect speech inputs from players. Depth-sensing camera 202 may utilize any suitable mechanisms for determining the depth of a target object (e.g. a player) in the field of view of the camera, including but not limited to structured light mechanisms. Likewise, microphone array 204 may have any suitable number and arrangement of microphones. For example, in one specific embodiment, microphone array 204 may have four microphones that are spatially arranged to avoid instances of a sound from a source destructively interfering at all four microphones. In other embodiments, the input device 100 may comprise an image sensor other than a depth-sensing camera.

Input device 100 also comprises memory 206 comprising instructions executable by a processor 208 to perform various functions related to receiving inputs from depth-sensing camera 202 and microphone array 204, processing such inputs, and/or communicating such inputs to console 102. Embodiments of such functions are described in more detail below. Console 102 likewise includes memory 210 having instructions stored thereon that are executable by a processor 212 to perform various functions related to the operation of entertainment system 10, embodiments of which are described in more detail below.

As described above, it may be difficult for a speech recognition system to discern intended speech inputs from other received sounds, such as background noise, background speech (i.e. speech not originating from a current user), etc. Further, it also may be difficult for a speech recognition system to differentiate speech from a current system user that is not intended to be an input. Current methods that involve a user issuing a specific speech command, such as "start listening," to initiate a speech-recognition session may be subject to false positives in which background noise randomly matches such speech patterns. Another method involves the utilization of a camera to detect the gaze of a current user to determine if speech from the user is intended as a speech input. However, this method relies upon a user being positioned in an expected location during system use, and therefore may not be effective in a dynamic use environment in which users move about, in which users may be out of view of the camera, and/or in which non-users may be present.

Figure 3:
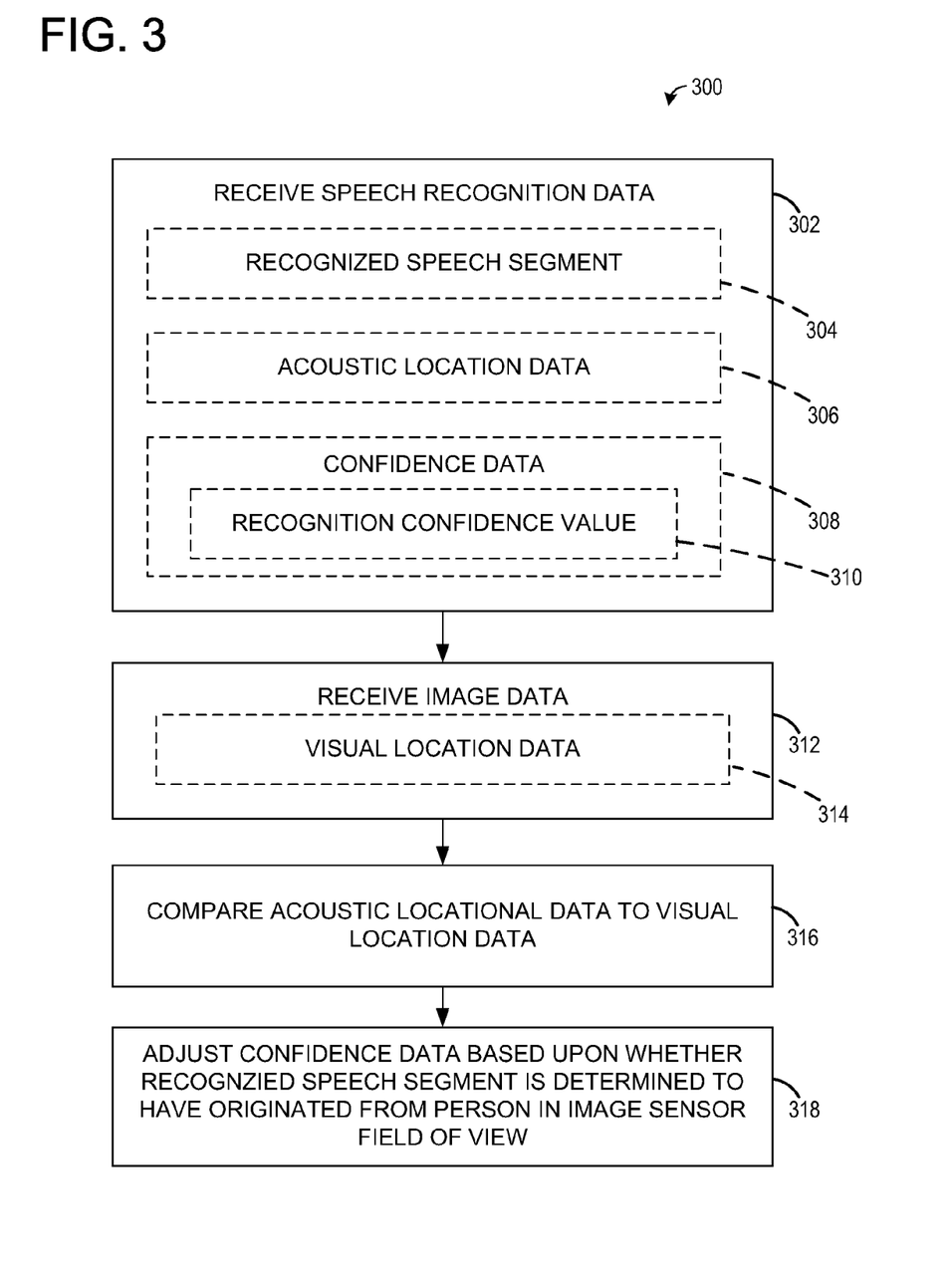
FIG. 3 shows a flow diagram depicting an embodiment of a method of analyzing speech input using identity data.

Accordingly, FIG. 3 shows a flow diagram depicting an embodiment of a method 300 for operating a speech recognition input system. Method 300 comprises, at 302, receiving speech recognition data. The speech recognition data may include data such as a recognized speech segment 304, acoustic location information 306 that indicates a direction and/or location of an origin of the recognized speech segment, and/or confidence data 308 that represents a confidence value of the certainty of a match of the recognized speech segment to the speech pattern to which it was matched. The recognized speech segment 304 and confidence data 308 may each be determined from analysis of sounds received by the microphone array, for example, by combining the signals from the microphones into a single speech signal via digital audio processing and then performing speech recognition analysis. Likewise, the acoustic location information 306 may be determined from the output of the microphone array via analysis of the relative times at which the recognized speech segment was received. Various techniques are known for each of these processes.

Next, method 300 comprises, at 312, receiving image data. The image data may comprise, for example, processed image data that was originally received by the depth-sensing camera and then processed to identify persons or other objects in the image. In some embodiments, individual pixels or groups of pixels in the image may be labeled with metadata that represents a type of object imaged at that pixel (e.g. "player 1"), and that also represents a distance of the object from an input device. This data is shown as "visual location information" 314 in FIG. 3. An example embodiment of such image data is described in further detail below.

After receiving the speech recognition data and the image data, method 300 next comprises, at 316, comparing the acoustic location information to the visual location information, and at 318, adjusting the confidence data based upon whether the recognized speech segment is determined to have originated from a person in the image sensor field of view. For example, if it is determined that the recognized speech segment did not originate from a player in view, the confidence value may be lowered, or a second confidence value may be added to the confidence data, wherein the second confidence value is an intended input confidence value configured (in this case) to communicate a lower level of confidence that the recognized speech segment came from an active user. Likewise, where it is determined that the recognized speech segment did originate from a player in view, the confidence value may be raised or left unaltered, or an intended input confidence value may be added to the confidence data to communicate a higher level of confidence that the recognized speech segment came from an active user.

In either case, the recognized speech segment and modified confidence data may be provided to an application for use. Using this data, the application may decide whether to accept or reject the recognized speech segment based upon the modified confidence data. Further, in some cases where it is determined that it is highly likely that the recognized speech segment was not intended to be a speech input, method 300 may comprise rejecting the recognized speech segment, and thus not passing it to an application. In this case, such rejection of a recognized speech segment may be considered an adjustment of a confidence level to a level below a minimum confidence threshold. It will be understood that the particular examples given above for adjusting the confidence data are described for the purpose of illustration, and that any other suitable adjustments to the confidence values may be made.

Figure 4:
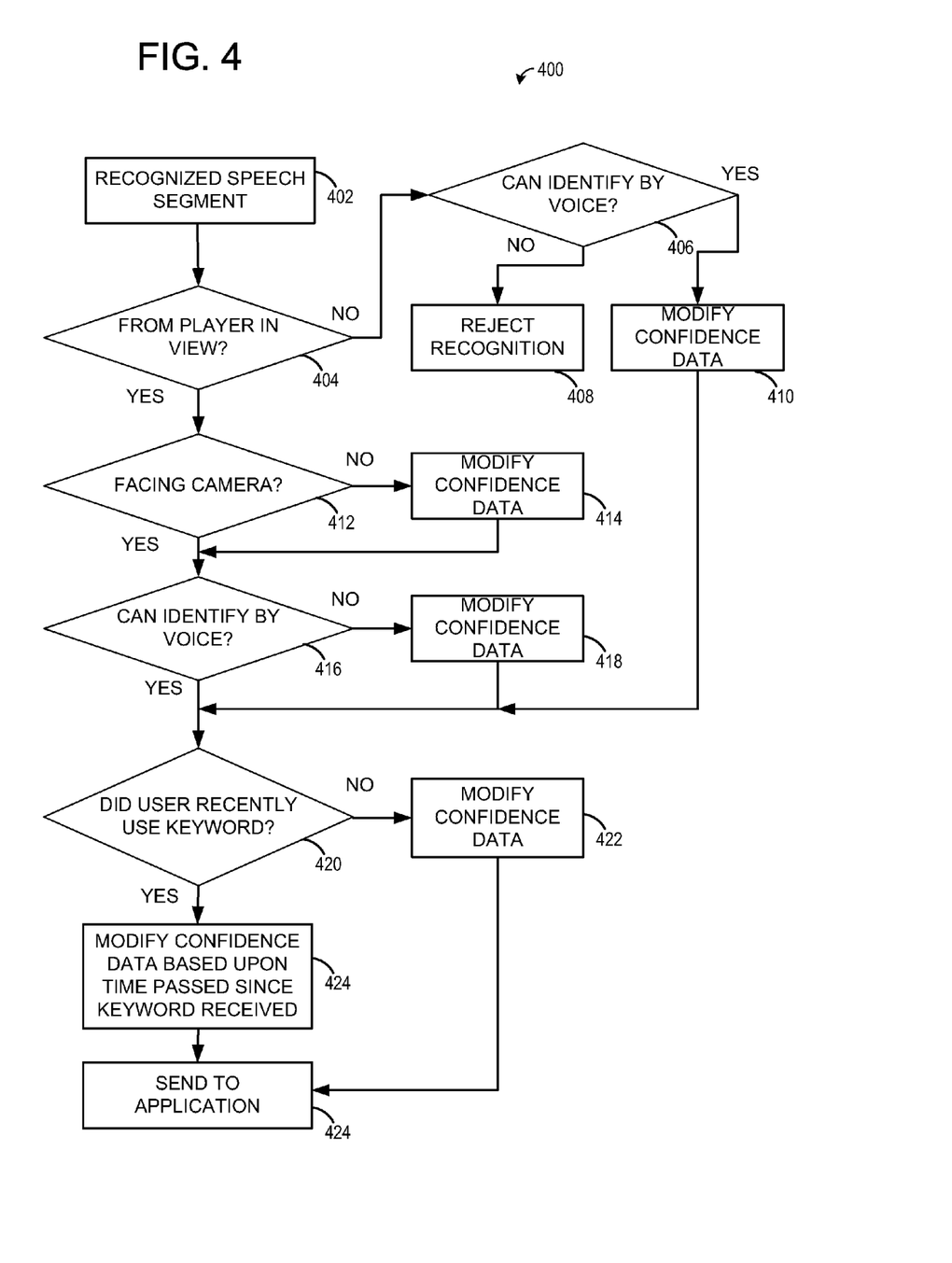
FIG. 4 shows a flow diagram depicting another embodiment of a method of analyzing speech input using identity data.
Figure 5:
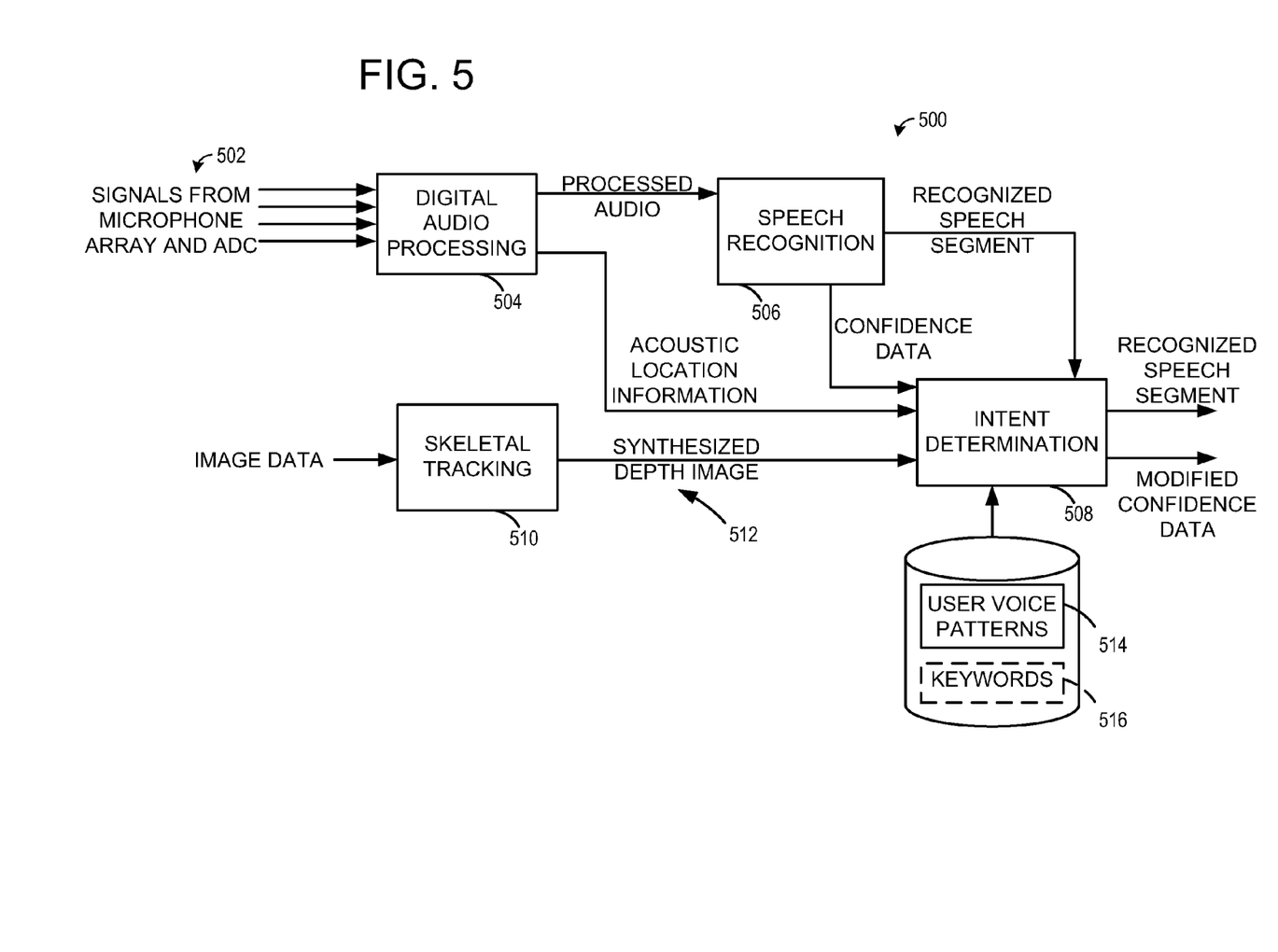
FIG. 5 shows a block diagram of an embodiment of a system for analyzing a speech input using identity data.

In some cases, other information than acoustic location information and visual location information may be used to help determine a level of confidence that a recognized speech segment is intended to be an input. FIG. 4 shows a flow diagram depicting an embodiment of a method 400 that utilizes various examples of data that may be used to help determine whether a recognized speech segment is intended to be a speech input. Further, FIG. 5 shows an embodiment of a system 500 suitable for performing method 400.

Method 400 comprises, at 402, receiving a recognized speech segment and confidence data. As illustrated in FIG. 5, such signals may be received as output from an audio processing pipeline configured to receive a plurality of audio signals from a microphone array via an analog-to-digital converter (ADC), as indicated at 502. The illustrated audio processing pipeline embodiment comprises one or more digital audio processing stages, illustrated generically by box 504, and also a speech recognition stage 506.

The digital audio processing stage 504 may be configured to perform any suitable digital audio processing on the digitized microphone signals. For example, the digital audio processing stage 504 may be configured to remove noise, to combine the four microphone signals into a single audio signal, and to output acoustic location information 507 that comprises information on a direction and/or location from which a speech input is received. The speech recognition stage 506, as described above, may be configured to compare inputs received from the digital audio processing stage 504 to a plurality of recognized speech patterns to attempt to recognize speech inputs. The speech recognition stage 506 may then output recognized speech segments and also confidence data for each recognized speech segment to an intent determination stage 508. Further, the intent determination stage 508 may also receive the acoustic location information from the digital audio processing stage 504. It will be understood that, in some embodiments, the acoustic location information may be received via the speech recognition stage 506, or from any other suitable component.

Referring back to FIG. 4, method 400 next comprises determining whether the recognized speech segment originated from a player in view of the image sensor. This determination may be made in any suitable manner. For example, referring again to FIG. 5, image data from a depth-sensing camera may be received by a video processing stage 510 that performs such video processing as skeletal tracking.

Figure 6:
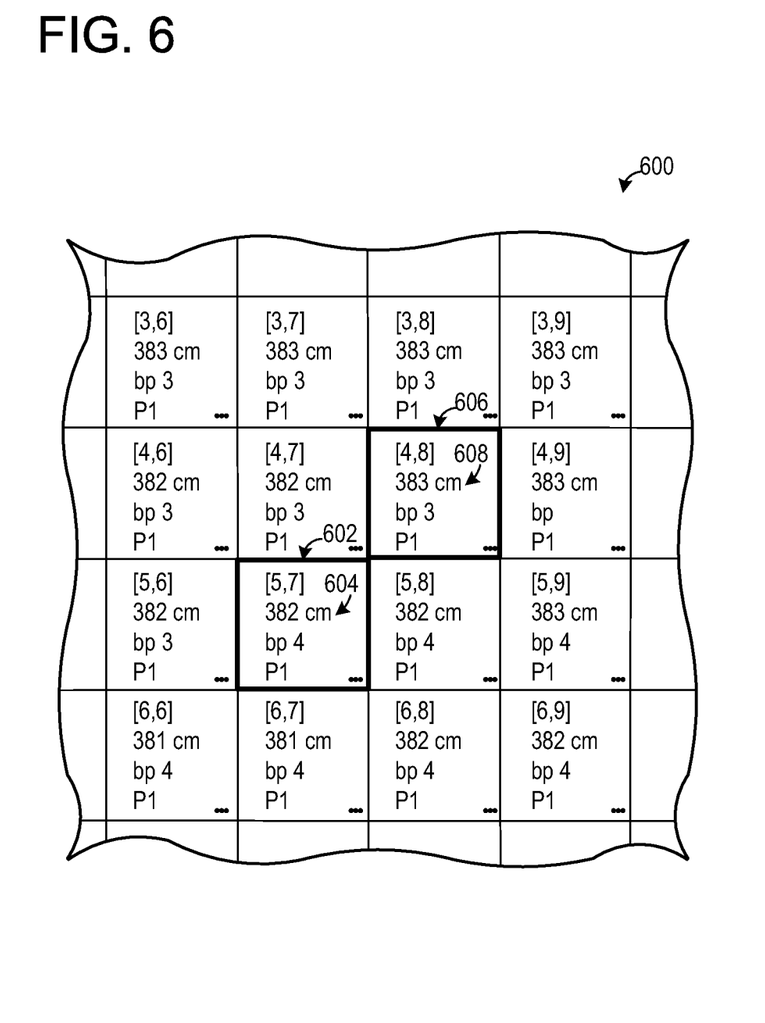
FIG. 6 shows a schematic depiction of a portion of an embodiment of a frame of a depth image.

The video processing stage 510 may output any suitable data, including but not limited to a synthesized depth image that includes information regarding the locations and depths of objects at each pixel as determined from skeletal tracking analysis. FIG. 6 shows a schematic view of data contained in a portion of an example embodiment of a synthesized depth image 600. Synthesized depth image 600 comprises a plurality of pixels each comprising image data and associated metadata that comprises information related to persons located in the image as determined via skeletal tracking. For example, a first pixel 602 comprises a first set of metadata 604. The first set of metadata 604 is shown as comprising, from top to bottom, a pixel index (shown as [x,y] coordinates), a depth value that indicates a depth of a part of a person's body in the image (e.g. a distance from the depth-sensing camera), a body part identification (here shown generically as "bp 4", or body part 4), and a player number ("P1", or player 1). Further, a second pixel 606 is seen to comprise a second set of metadata 608. Comparing the first set of metadata 604 and the second set of metadata 608, it can be seen that the first pixel 602 and second pixel 606 are identified as imaging different body parts at different distances from the depth-sensing camera. Thus, the processed image data comprises visual locational information related to a distance of each person in the field of view of the depth-sensing camera.

Referring again to FIG. 4, such visual location information may be compared, at 404, to the acoustic location information to help determine whether the recognized speech segment originated from a player in the field of view of the depth-sensing camera or other image sensor. If it is determined that the recognized speech segment did not originate from a player in the field of view of the depth-sensing camera, then method 400 comprises, at 406, determining whether the person from whom the recognized speech segment originated can be identified by voice. This may be performed in any suitable manner. For example, referring again to FIG. 5, a database of user voice patterns 514 may be maintained by an interactive entertainment system (e.g. each new user of the system may be asked to input a voice sample to allow the system to maintain a record of the user's voice pattern) to allow the subsequent identification of users by voice. Referring back to FIG. 4, if it is determined that the recognized speech segment did not originate from a player in view and the speaker cannot be identified by voice, then method 400 comprises rejecting the recognized sound segment, as shown at 408. In this instance, the recognized sound segment is not passed to an application for use. On the other hand, if the speaker can be identified by voice, then the confidence data is modified at 510 to reflect a reduction in confidence that the recognized speech input was intended to be an input. It will be understood that, in other embodiments, the recognized speech segment may not be rejected, but instead the confidence data may be modified, where the speaker is not in the field of view of the depth sensing camera and cannot be identified by voice.

Returning to process 404, if it is determined that the recognized speech segment originated from a person in the field of view of the depth-sensing camera, then method 400 comprises, at 412, determining if the person is facing the depth-sensing camera. This may comprise, for example, determining if the visual location data indicates that any facial features of the player are visible (e.g. eyes, nose, mouth, overall face, etc.). Such a determination may be useful, for example, to distinguish between a user sitting side-by-side with and talking to another user (i.e. speech made by a non-active user) from the user making a speech input (i.e. speech made by an active user). If it is determined at 412 that the user is not facing the camera, then method 400 comprises, at 414, adjusting the confidence data to reflect a reduction in confidence that the recognized speech input was intended to be an input. On the other hand, if it is determined that the user is facing the camera, then the confidence data is not adjusted. It will be understood that, in other embodiments, any other suitable adjustments may be made to the confidence data other than those described herein to reflect the difference confidence levels resulting from the determination at 412.

Next, at 416, it is determined whether the person from whom the recognized speech segment originated can be identified by voice. As described above for process 406, this may be performed in any suitable manner, such as by consulting a database of user voice patterns 514. If it is determined that the recognized speech segment did not originate from a player in view and the speaker cannot be identified by voice, then method 400 comprises at 418, adjusting the confidence data to reflect a reduction in confidence that the recognized speech input was intended to be an input. On the other hand, if it is determined that the user is facing the camera, then the confidence data is not adjusted. It will be understood that, in other embodiments, any other suitable adjustments may be made to the confidence data other than those described herein to reflect the difference confidence levels resulting from the determination at 416.

Method 400 next comprises, at 420, determining whether the user's speech input contains a recognized keyword. Such recognized keywords may be words or phrases considered to be indicative that subsequent speech is likely to be intended as a speech input, and may be stored in a database, as indicated at 516 in FIG. 5. If it is determined at 420 that the recognized speech segment was not preceded by a keyword received in a predetermined window of time, then method 400 comprises, at 422, adjusting the confidence data. On the other hand, if it is determined that the recognized speech segment was preceded by a keyword within the predetermined window of time, then method 400 comprises adjusting the confidence data based upon an amount of time that passed between receiving the keyword and the recognized speech segment. For example, in some embodiments, the magnitude of the adjustment applied may follow a decay-type curve as a function of time, such that the adjustment reflects a progressively lesser confidence as more time passes between receiving the keyword and receiving the recognized speech segment. In other embodiments, the adjustment may be binary or stepped in nature, such that no adjustment is made to the confidence data until a predetermined amount of time passes between receiving a keyword and receiving the recognized speech segment. It will be understood that these examples of time-dependent adjustments are described for the purpose of illustration, and are not intended to be limiting in any manner.

It further will be understood that the examples of, and order of, processes shown in FIG. 4 are presented for the purpose of example and are not intended be limiting. In other embodiments, a determination of an intent of a user to make a speech input may utilize only a subset of the illustrated processes and/or additional processes not shown. Furthermore, such processes may be applied in any suitable order.

It also will be appreciated that the computing devices described herein may be any suitable computing device configured to execute the programs described herein. For example, the computing devices may be a mainframe computer, personal computer, laptop computer, portable data assistant (PDA), set top box, game console, computer-enabled wireless telephone, networked computing device, or other suitable computing device, and may be connected to each other via computer networks, such as the Internet. These computing devices typically include a processor and associated volatile and non-volatile memory, and are configured to execute programs stored in non-volatile memory using portions of volatile memory and the processor. As used herein, the term "program" refers to software or firmware components that may be executed by, or utilized by, one or more computing devices described herein, and is meant to encompass individual or groups of executable files, data files, libraries, drivers, scripts, database records, etc. It will be appreciated that computer-readable storage media may be provided having program instructions stored thereon, which upon execution by a computing device, cause the computing device to execute the methods described above and cause operation of the systems described above.

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. In a computing system comprising a microphone array and an image sensor, a method of operating a speech recognition input system, the method comprising:

receiving speech recognition data as an output from a speech recognition stage of an audio processing pipeline, the speech recognition data comprising a recognized speech segment and confidence data comprising a recognition confidence value that represents a confidence in a certainty of a match of the recognized speech segment to a speech pattern;

receiving acoustic locational data as an output from a digital audio processing stage of the audio processing pipeline, the acoustic locational data related to a location of origin of the recognized speech segment as determined via signals from the microphone array;

receiving image data comprising visual locational information related to a location of each person located in a field of view of the image sensor;

comparing the acoustic locational data to the visual locational information to determine whether the recognized speech segment originated from a person in the field of view of the image sensor; and adjusting the confidence data based upon whether the recognized speech segment is determined to have originated from a person in the field of view of the image sensor.

2. The method of claim 1, wherein adjusting the confidence data comprises adjusting the recognition confidence value such that the recognition confidence value has a lower value after adjusting if the recognized speech segment is determined not to have originated from a person in the field of view of the image sensor than if the recognized speech segment is determined to have originated from a person in the field of view of the image sensor.

3. The method of claim 1, further comprising determining to reject the recognized speech segment as a speech input when the recognition confidence value is below a minimum confidence threshold.

4. The method of claim 1, further comprising adjusting the confidence data based upon whether the recognized speech segment is determined to have originated from a recognized speaker.

5. The method of claim 1, wherein, if the recognized speech segment is determined not to have originated from a recognized speaker and is determined not to have originated from a person in the field of view of the image sensor, then adjusting the confidence data comprises rejecting the recognized speech segment.

6. The method of claim 1, wherein, if it is determined that the recognized speech segment originated from a person in the field of view of the image sensor, then determining whether a face of the person is facing the image sensor, and adjusting the recognition confidence value such that the recognition confidence value has a lower value after adjusting if the face of the person is not facing the image sensor than if the face of the person is facing the image sensor.

7. The method of claim 1, further comprising receiving a speech input of a keyword before receiving the recognized speech segment, and wherein adjusting the confidence data comprises adjusting the recognition confidence value based upon an amount of time that passed between receiving the speech input of the keyword and receiving the recognized speech segment.

8. The method of claim 1, wherein the image sensor is a depth-sensing camera, and wherein receiving image data comprising visual locational information comprises receiving image data comprising information related to a distance of each person in the field of view of the depth-sensing camera.

9. An interactive entertainment system, comprising:
a depth-sensing camera;
a microphone array comprising a plurality of microphones; and a computing device comprising a processor and memory comprising instructions stored thereon that are executable by the processor to:
receive speech recognition data as an output from a speech recognition stage of an audio processing pipeline, the speech recognition data comprising a recognized speech segment and confidence data comprising a recognition confidence value that represents a confidence in a certainty of a match of the recognized speech segment to a speech pattern;
receive acoustic locational data as an output from a digital audio processing stage of the audio processing pipeline, the acoustic locational data related to a location of origin of the recognized speech segment as determined via signals from the microphone array;
receive image data comprising visual locational information related to a location of each person located in a field of view of the depth-sensing camera;
compare the acoustic locational data to the visual locational data to determine whether the recognized speech segment originated from a person in the field of view of an image sensor; and
adjust the confidence data based upon whether the recognized speech segment is determined to have originated from a person in the field of view of the depth-sensing camera.

10. The interactive entertainment system of claim 9, wherein the instructions are executable to adjust the confidence data by adjusting the recognition confidence value such that the recognition confidence value has a lower value after adjusting if the recognized speech segment is determined not to have originated from a person in the field of view of the depth-sensing camera than if the recognized speech segment is determined to have originated from a person in the field of view of the depth-sensing camera.

11. The interactive entertainment system of claim 9, wherein the instructions are further executable to determine to reject the recognized speech segment as a speech input when the confidence value is below a minimum confidence threshold.

12. The interactive entertainment system of claim 9, wherein the instructions are further executable to:
determine if the recognized speech segment originated from a recognized speaker; and
adjust the confidence data based upon whether the recognized speech segment is determined to have originated from a recognized speaker.

13. The interactive entertainment system of claim 12, wherein the instructions are further executable to reject the recognized speech segment if the recognized speech segment is determined not to have originated from a recognized speaker and the recognized speech segment is determined not to have originated from a person in the field of view of the depth-sensing camera.

14. The interactive entertainment system of claim 9, wherein the instructions are further executable to:
determine that the recognized speech segment originated from a person in the field of view of the image sensor,
determine whether a face of the person is facing the image sensor; and
adjust the confidence data such that the recognition confidence value has a lower value after adjusting if the face of the person is not facing the image sensor than if the face of the person is facing the image sensor.

15. The interactive entertainment device of claim 9, further comprising receiving a speech input of a keyword before receiving the recognized speech segment, and wherein adjusting the confidence data comprises adjusting the recognized confidence value based upon an amount of time that passed between receiving the speech input of the keyword and receiving the recognized speech segment.

16. A hardware computer-readable storage device comprising instructions stored thereon that are executable by a computing device to:
receive speech recognition data as an output from a speech recognition stage of an audio processing pipeline, the speech recognition stage being configured to compare inputs received from a digital audio processing stage of the audio processing pipeline to a plurality of recognized speech patterns to recognize speech inputs, and the speech recognition data comprising a recognized speech segment and confidence data comprising a recognition confidence value that represents a confidence in a certainty of a match of the recognized speech segment to a speech pattern;
receive acoustic locational data as an output from a digital audio processing stage of the audio processing pipeline, the acoustic locational data related to a location of origin of the recognized speech segment as determined via signals from a microphone array;
receive image data comprising visual locational information related to a location of each person located in a field of view of a depth-sensing camera;
compare the acoustic locational data to the visual locational data to determine whether the recognized speech segment originated from a person in the field of view of an image sensor;
adjust the confidence data based upon whether the recognized speech segment is determined to have originated from a person in the field of view of the depth-sensing camera;
if it is determined that the recognized speech segment originated from a person in the field of view of the image sensor, then determine whether a face of the person is facing the image sensor; and
adjusting the confidence data such that the recognition confidence value has a lower value after adjusting if the face of the person is not facing the image sensor than if the face of the person is facing the image sensor.

17. The hardware computer-readable storage device of claim 16, wherein the instructions are further executable to:
determine if the recognized speech segment originated from a recognized speaker; and
adjust the confidence data based upon whether the recognized speech segment is determined to have originated from a recognized speaker.

18. The hardware computer-readable storage device of claim 17 wherein the instructions are executable to reject the recognized speech segment if the recognized speech segment is determined not to have originated from a recognized speaker and the recognized speech segment is determined not to have originated from a person in the field of view of the depth-sensing camera.

19. The hardware computer-readable storage device of claim 16, wherein the instructions are further executable to receive a speech input of a keyword before receiving the recognized speech segment, and adjust the recognized confidence value based upon an amount of time that passed between receiving the speech input of the keyword and receiving the recognized speech segment.

20. The hardware computer-readable storage device of claim 16, wherein the instructions are further executable to adjust the confidence data by one or more of adjusting the recognition confidence value and including an intended input confidence value in the confidence data.

\* \* \* \* \*